United States Patent
Polvani

(10) Patent No.: US 7,505,364 B2
(45) Date of Patent: Mar. 17, 2009

(54) UNDERWATER NAVIGATION BY AIDED LIGHT SENSOR

(75) Inventor: Donald Polvani, Arnold, MD (US)

(73) Assignee: Northrop Grumman Corporation, Los Angeles, CA (US)

( * ) Notice: Subject to any disclaimer, the term of this patent is extended or adjusted under 35 U.S.C. 154(b) by 285 days.

(21) Appl. No.: 11/472,413

(22) Filed: Jun. 22, 2006

(65) Prior Publication Data

US 2007/0297289 A1  Dec. 27, 2007

(51) Int. Cl.
H04B 11/00 (2006.01)

(52) U.S. Cl. ..................................... 367/131

(58) Field of Classification Search ................. 367/131, 367/907, 128; 701/21, 200, 220; 73/1.77, 73/178 R, 503, 504.02; 33/316, 321, 324; 340/850, 851; 702/147
See application file for complete search history.

(56) References Cited

U.S. PATENT DOCUMENTS

| | | | |
|---|---|---|---|
| 3,283,409 A | 11/1966 | Rothe et al. | |
| 3,769,710 A | 11/1973 | Reister | |
| 3,917,408 A | 11/1975 | Stachnik | |
| 3,940,597 A * | 2/1976 | DiMatteo | 701/223 |
| 4,315,326 A | 2/1982 | Chase, Jr. | |
| 5,321,268 A | 6/1994 | Crosby et al. | |
| 5,339,684 A | 8/1994 | Jircitano et al. | |
| 5,923,286 A * | 7/1999 | Divakaruni | 342/357.06 |
| 6,256,264 B1 | 7/2001 | Beckman et al. | |
| 6,311,129 B1 | 10/2001 | Lin | |
| 6,456,939 B1 | 9/2002 | McCall et al. | |
| 6,459,990 B1 | 10/2002 | McCall et al. | |
| 6,512,976 B1 | 1/2003 | Sabatino et al. | |
| 6,819,984 B1 | 11/2004 | Bedckman et al. | |
| 2002/0071345 A1 | 6/2002 | Chiang et al. | |
| 2003/0078706 A1 | 4/2003 | Larsen | |
| 2003/0135327 A1 | 7/2003 | Levine et al. | |
| 2004/0068371 A1 | 4/2004 | Estep | |
| 2005/0125141 A1 | 6/2005 | Bye | |
| 2007/0297289 A1 * | 12/2007 | Polvani | 367/131 |

* cited by examiner

Primary Examiner—Dan Pihulic
(74) Attorney, Agent, or Firm—Rothwell, Figg, Ernst & Manbeck

(57) ABSTRACT

The present invention provides a navigation system for an unmanned underwater vehicle that includes at least two navigation sensors that provide latitude and longitude measurements of unequal accuracy, a processor and a memory. The memory stores a machine-readable set of instructions executable by the processor to process the latitude and longitude measurements received from the navigation sensors, and to estimate vehicle latitude and longitude with approximately equal accuracy.

25 Claims, 4 Drawing Sheets

UNDERWATER NAVIGATION BY AIDED LIGHT SENSOR

FIELD OF THE INVENTION

The present invention relates to navigation. More particularly, the present invention relates to navigation for unmanned underwater vehicles using sensors that provide measurements of latitude and longitude of unequal accuracy.

BACKGROUND OF THE INVENTION

Traditional navigation systems for manned vessels, such as inertial navigation systems, Doppler-aided inertial navigation systems, GPS-aided inertial navigation systems, etc., are highly accurate but relatively large, heavy, expensive, and power-hungry. Conversely, a navigation system for an unmanned underwater vehicle (UUV) is preferably small in size, lightweight and inexpensive, and should consume much less power than a traditional inertial navigation system in order to facilitate long duration, autonomous missions.

For example, the navigational load may be apportioned between a more accurate navigation system, to be used during a small portion of the UUV mission, such as a search phase, and a less accurate navigation system, to be used during the remaining portion of the UUV mission, such as the transit phase(s). Of course, the UUV navigation system used during the transit phase must satisfy particular navigational accuracy requirements, such as, for example, 10 nautical miles (nm) (1−σ) in both latitude and longitude.

While inexpensive sensors have been produced which can measure either latitude or longitude to an accuracy of about 10 nm, an inexpensive, compact, light weight, low power navigation system has yet to be developed which can estimate both latitude and longitude to the same accuracy, i.e., about 10 nm.

For example, in recent years wildlife scientists have attached inexpensive, miniature archival light sensors to fish in order to record their movements in the open ocean. These sensors typically record underwater light level, depth and temperature data. Contemporary sensors can sense light at approximately 300 meter depths and offer up to 16 MB of data storage. Latitude and longitude can be determined from the light measurements, depth measurements and an on-board clock. Accuracies depend on total daily sensor motion, depth, time of the year, and cloud cover patterns but can be, at the one sigma level, approximately 10 nm (about 20 km) in longitude and 130 nm (about 260 km) in latitude. These light sensors are typically better at measuring longitude than latitude, since the estimation of local noon (i.e., longitude) is more accurate than the estimation of the length of the day (i.e., latitude).

Inexpensive microelectromechanical system (MEMS) devices include miniature accelerometers, angular rate sensors, gyroscopes, etc., which may be combined to form a MEMS inertial measurement unit (IMU). MEMS gyroscopes offer low cost, compact size, low weight, and low power consumption, but are far less accurate than fiber-optic or ring-laser gyros. Unfortunately, when several MEMS gyroscopes, or angular rate sensors, are combined with several MEMS accelerometers, and other electronics, to form a MEMS IMU, the cost, weight, size and power consumption increase substantially over a single MEMS gyroscope.

Thus, a need remains for an inexpensive, small, lightweight, low power underwater navigation system that can estimate both latitude and longitude to the same accuracy, such as, for example, 10 nm.

SUMMARY OF THE INVENTION

Embodiments of the present invention provide a navigation system for an unmanned underwater vehicle that includes at least two navigation sensors that provide latitude and longitude measurements of unequal accuracy, a processor and a memory. The memory stores a machine-readable set of instructions executable by the processor to process the latitude and longitude measurements received from the navigation sensors, and to estimate vehicle latitude and longitude with approximately equal accuracy.

BRIEF DESCRIPTION OF THE DRAWINGS

The above and other advantages of this invention will become more apparent by the following description of invention and the accompanying drawings.

DETAILED DESCRIPTION

The present invention provides an inexpensive, compact, low weight, low power navigation system which uses relatively inexpensive navigation sensors to estimate the position of an underwater vehicle. The expected low cost, small size, light weight, and low power characteristics of the present invention are very desirable for long duration autonomous UUV missions. For example, the present invention may be used for travel to, and from, a general search area, while a more accurate (and power hungry) navigation system may be used during the search.

Figure 1:
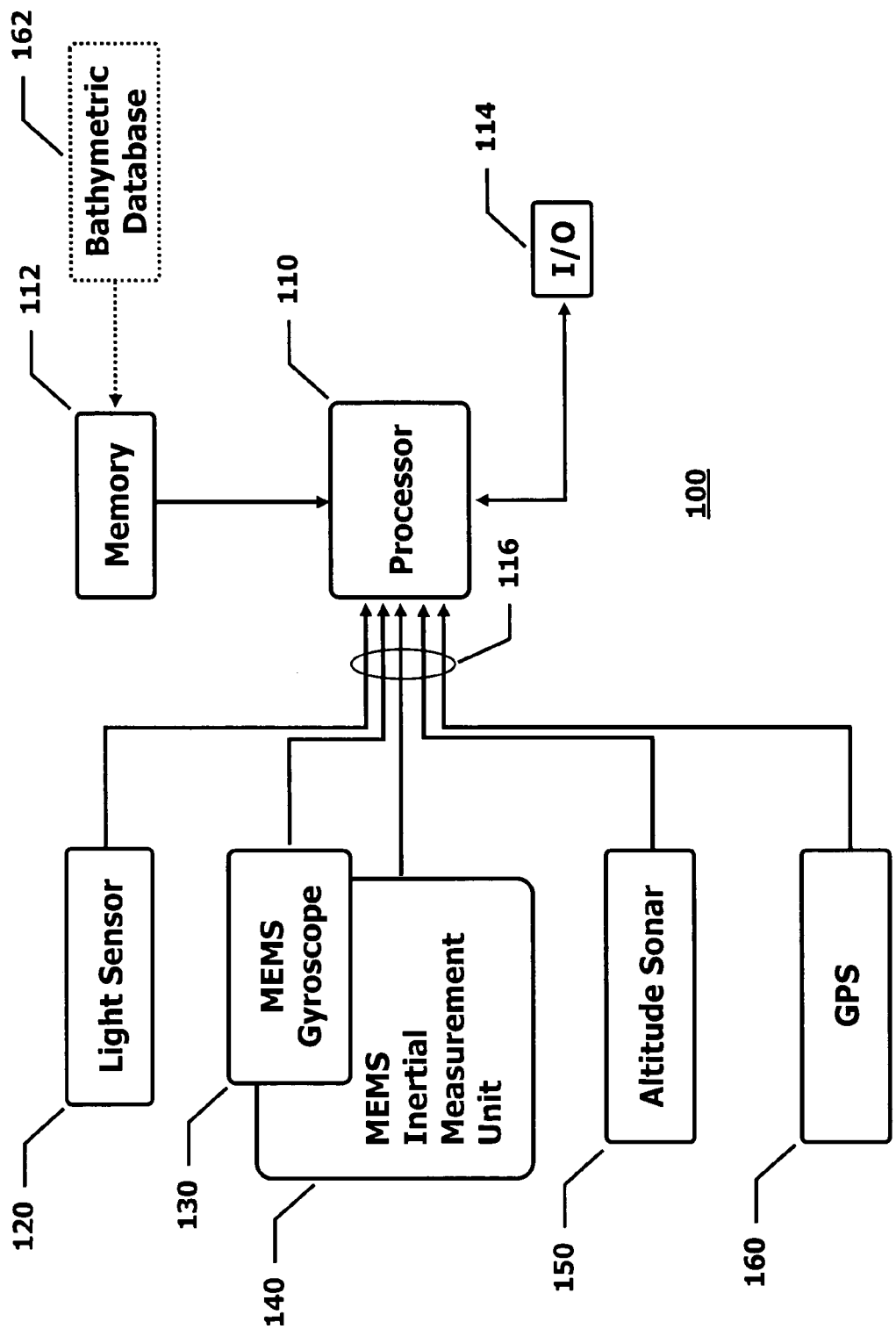
FIG. 1 is a schematic diagram depicting a navigation system in accordance with embodiments of the present invention.

FIG. 1 is a schematic diagram depicting a navigation system 100 for an underwater vehicle, in accordance with embodiments of the present invention. Navigation system 100 includes a plurality of relatively inexpensive navigation sensors, such as, for example, light sensor 120 and MEMS gyroscope 130, that provide measurements of latitude and longitude of unequal accuracy, respectively. Navigation system 100 also includes a processor 110 and a memory 112 that stores a set of machine readable instructions executable by the processor 110 to process latitude and longitude measurements, received from the navigation sensors, in order to accurately determine latitude and longitude. In other embodiments, additional navigation sensors may be included, such as, for example, a MEMS Inertial Measurement Unit (IMU) 140, an altitude sonar 150 and bathymetric database 162, a Global Positioning System (GPS) 160, etc.

The processor 110 is coupled to the light sensor 120 and the MEMS gyroscope 130, as well as to the memory 112. The processor 110 is also coupled to an I/O port 114 in order to communicate with other components or subsystems of the vehicle, such as, for example, a guidance and control subsystem, a communications subsystem, a payload, etc. Alternatively, processor 110 may perform various aspects of these subsystem functionalities, such as, for example, guidance and control, etc. The I/O port 114 may support various reference signals, data bus signals, etc. In one embodiment, the light sensor 120 and MEMS gyroscope 130 are coupled directed to the processor 110, while in another embodiment, the light sensor 120 and MEMS gyroscope 130 are coupled to the processor 110 through a data bus 116.

The light sensor 120 provides latitude and longitude data to the processor 110. An exemplary light sensor is the LTD 2350 Geolocation Tag, manufactured by Lotek Wireless Inc.

Figure 2:
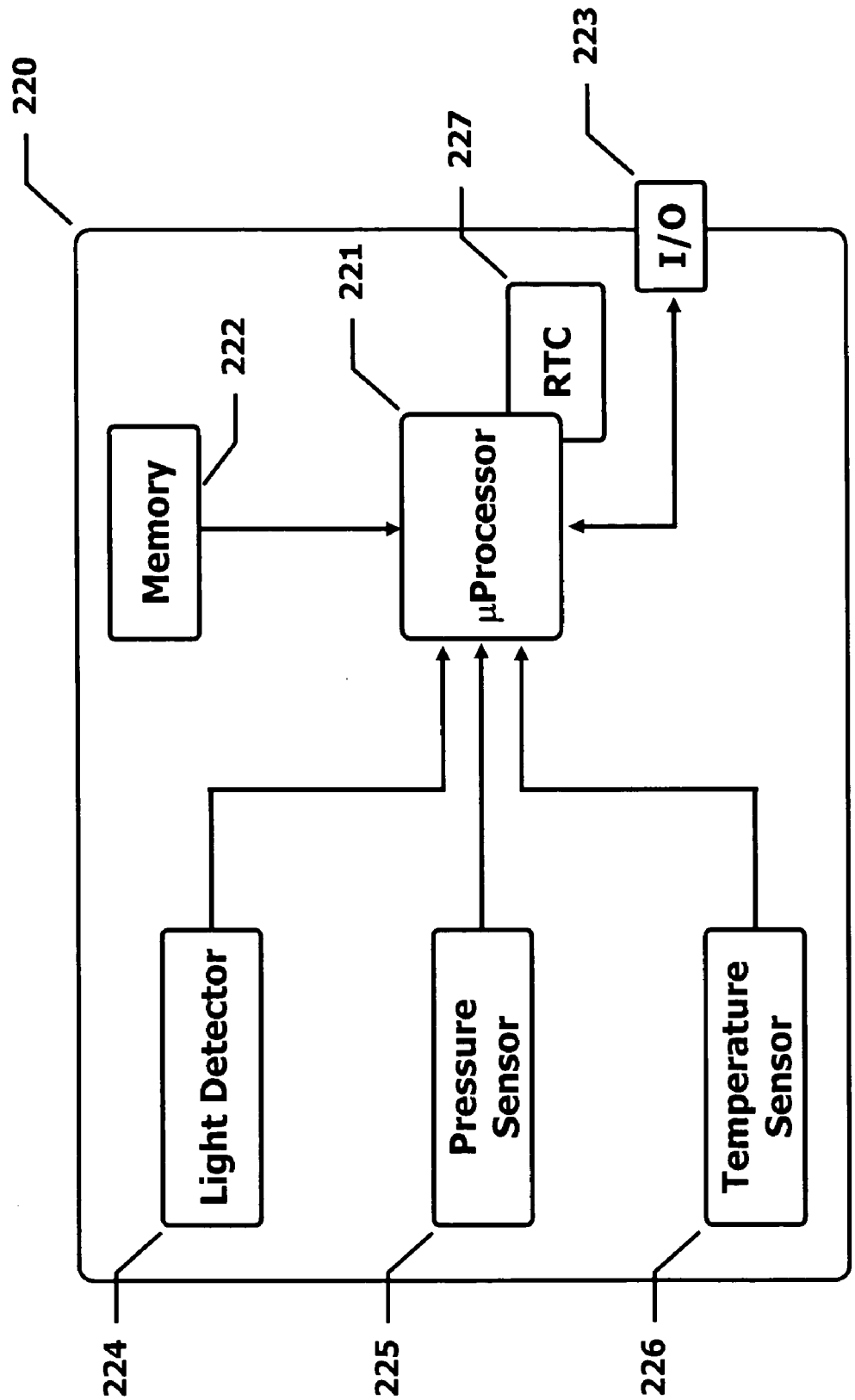
FIG. 2 is a schematic diagram depicting a light sensor in accordance with embodiments of the present invention.

FIG. 2 depicts a light sensor 220 in accordance with embodiments of the present invention. The light sensor 220 includes a microprocessor 221 coupled to a memory 222, an I/O port 223, a light detector 224 and a pressure sensor 225. Preferably, the light sensor 220 receives a real time clock signal from an external source through I/O port 223, such as, for example, a frequency standard (not shown), a GPS receiver, etc. Advantageously, a common time reference signal, e.g., 1 PPS, may be distributed to all of the components of the navigation system 100, as required. Greenwich Mean Time (GMT) time and date messages may also be provided to the light sensor 220 through the I/O port 223. Alternatively, a temperature sensor 226 and a temperature-compensated, crystal-controlled real time clock 227, synchronized to GMT, may be coupled to the microprocessor 221. In this embodiment, the data provided by the temperature sensor 226 may be used to compensate the real time clock 227.

The light detector 224 includes a photodiode, for example, to detect ambient light levels in the water surrounding the vehicle. In order to maximize the depth at which light may be detected by the light detector 224, a filter may be used to limit the optical spectrum to a narrow range of frequencies, such as, for example, a bandpass filter centered at approximately 460 nm to 470 nm (i.e., the blue-green region). The microprocessor 221 periodically acquires ambient light level measurements from the light detector 224, from which the local sunrise, sunset, noon, midnight and day length are calculated. From these data, longitude is determined based on the time difference between local noon and GMT, while latitude is determined based on the day length and Julian date.

Figure 3:
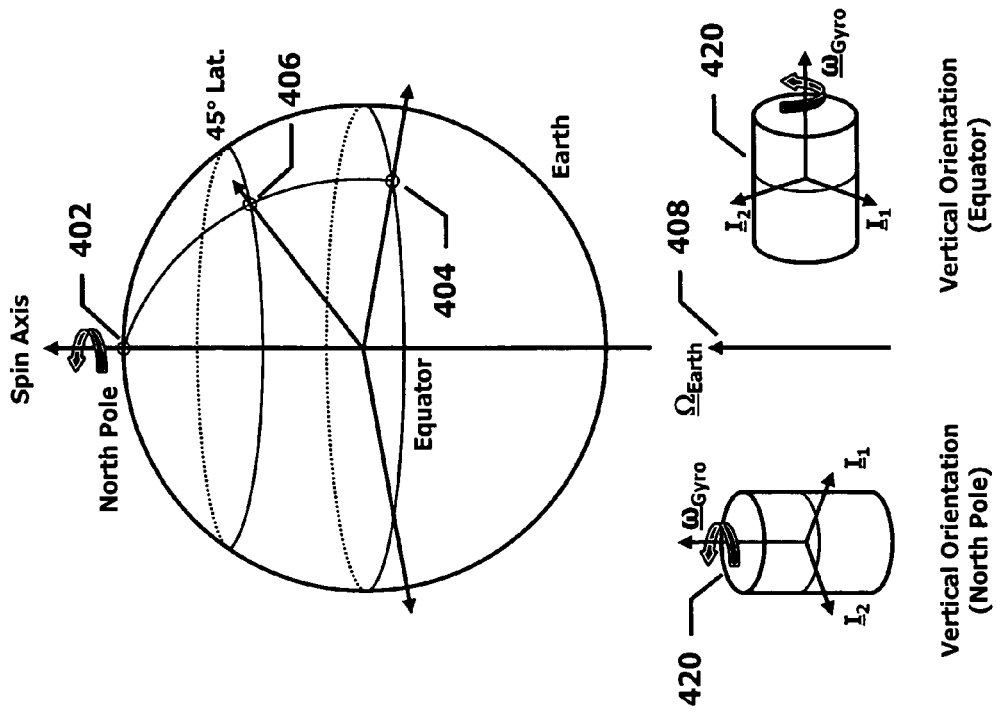
FIG. 3 illustrates an idealized plot of normalized light sensor ambient light levels vs. time according to an embodiment of the present invention.

FIG. 3 illustrates an idealized plot 300 of normalized ambient light levels vs. time for a light sensor 120 located at a constant, arbitrary depth, assuming no cloud cover. During the evening hours, the ambient light level is at a minimum, while during the daylight hours, the ambient light level is at a maximum. The positively and negatively sloped regions represent the transition periods of sunrise and sunset, respectively. A threshold for each transition region is used to determine the time of sunrise 302 and the time of sunset 306. The threshold 312 may be the same for each region, as depicted in FIG. 3, or the thresholds may be different in order to place each one within the steepest portion of their respective region. The day length 310 is determined based on the difference between the sunrise 302 and sunset 306 times, while noon 304 is determined based on the average of the sunrise 302 and sunset 306 times.

In this example, noon 304 occurs at 12:00 pm GMT, which corresponds to a longitude of 0° 0' 0". The day length is 12 hours, which, generally, infers a latitude near the equator. However, during the solar equinox, for example, latitude depends very weakly on day length. Clearly, latitude determinations based on ambient light levels are far less accurate than longitude determinations. Furthermore, if the vehicle experiences changes in depth over the day, then the ambient light levels must be corrected accordingly. A simple exponential correction, based on the data provided by the pressure sensor 225, may be employed.

The MEMS gyroscope 130 provides angular rate data about two orthogonal input axes, I1 and I2, to the processor 110. An exemplary MEMS gyroscope is the G 2000 Dynamically Tuned Gyroscope, manufactured by Northrop Grumman Corp., having an input rate of 200 deg/sec and drift of 0.6 deg/hr.

Figure 4:
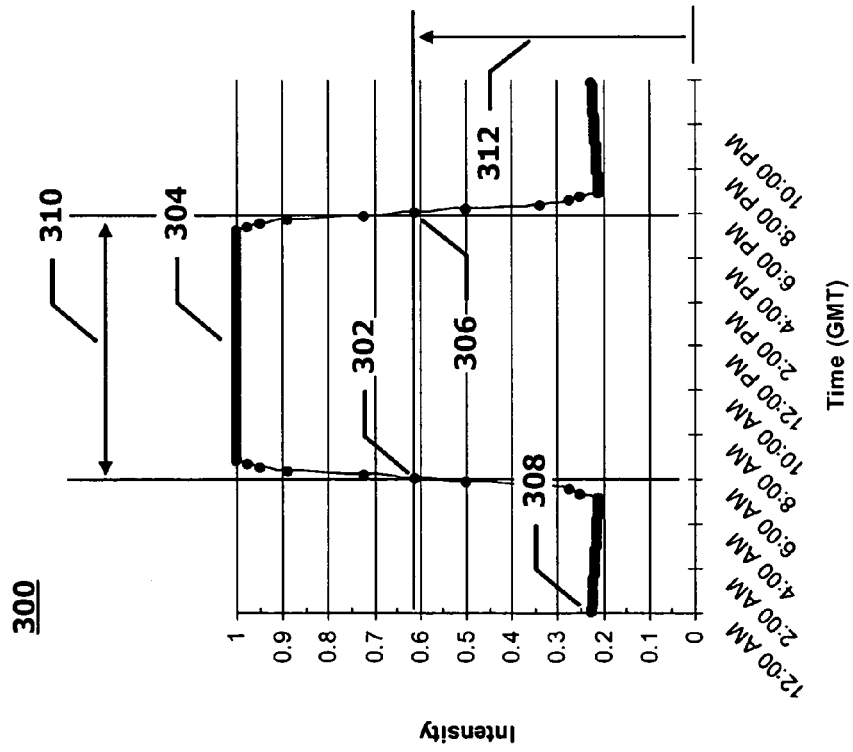
FIG. 4 depicts a representation of the Earth spinning about its axis, along with the orientation of a MEMS gyroscope with respect to the Earth's rotation vector, in accordance with an embodiment of the present invention.

FIG. 4 depicts a representation of the Earth, the Earth's rotation vector 408 and a vertically-oriented, stationary MEMS gyroscope 420 at the North Pole and the Equator. The two input axes of the MEMS gyroscope 420, $I_1$ and $I_2$, form a response plane which, for any given latitude, includes a projection, i.e., a vector component, of the Earth's rotation vector 408. For example, if a vertically-oriented, stationary MEMS gyroscope 420 is located at an equatorial position 404 (i.e., 0° latitude), the Earth's rotation vector 408 will lie completely within the response plane defined by the input axes $I_1$ and $I_2$. Thus, the Earth's rotation vector 408 may be easily measured by the MEMS gyroscope 420, and the magnitude of this maximum value may be determined by combining the responses of the input axis $I_1$ and $I_2$ in vector fashion, i.e., the square root of the sum of the squares.

Similarly, if the vertically-oriented, stationary MEMS gyroscope 420 is located at a north pole position 402 (i.e., 90° latitude), the Earth's rotation vector 408 will lie completely outside the response plane defined by the input axes $I_1$ and $I_2$. In other words, the Earth's rotation vector 408 is perpendicular to the response plane. In this case, the Earth's rotation vector 408 will not be measured by the MEMS gyroscope 420, and a minimum value, approaching zero, may be determined. Advantageously, any arbitrary latitude may be determined by a vertically-oriented, non-rotating gyroscope once the minimum and maximum response magnitudes are known. In a preferred embodiment, if the vertically-oriented, stationary MEMS gyroscope 420 is located at unknown position 406, the vector magnitude of the responses of the input axis $I_1$ and $I_2$ is calculated and then divided by the maximum value of the Earth's rotation vector 408 determined apriori. The resulting quantity is then converted to latitude by applying an inverse cosine function. Alternatively, a look-up table, containing, for example, inverse cosine values, may be consulted. Assuming minimal error due to vertical orientation and rigid body rotation, a MEMS gyroscope 420 can measure latitude to approximately 10 nm at the equator (1−σ).

Of course, it is not necessary to travel to the equator and the north pole to measure the maximum and minimum values of the Earth's rotation vector 408 using the MEMS gyroscope 420. At any given latitude, once the direction of the local vertical is determined, the MEMS gyroscope 420 can be manipulated such that the Earth's rotation vector 408 is first normal to the response plane and then perpendicular to the response plane. Angular rate measurements are taken using the MEMS gyroscope 420, at each orientation, and the minimum and maximum values of the Earth's rotation vector 408 are recorded. The direction of local vertical may be determined, for example, by three orthogonal accelerometers placed at known orientations with respect to the MEMS gyroscope 420. For example, the accelerometers and MEMS gyroscope 420 could be rotated as a unit so that only one accelerometer indicates the earth's gravity with a null reading from each of the other two accelerometers. The direction of local vertical then lies along the one accelerometer indicating the earth's gravity. A stable platform may be used to increase the accuracy of the measurements.

The latitude estimate, provided by the light sensor 120, is combined with the longitude estimate, calculated by the processor 110, to determine the position of the vehicle. In one embodiment, a number of latitude and longitude estimates may be curve fit, by standard least-squares techniques, to improve system accuracy and provide navigational information between measured points. The "n" measurements are determined by a "sliding data window," i.e., the "n" measurements are always the latest "n" measurements available, so that the oldest measurement is dropped as soon as a new measurement is available.

While the present invention is directed to a navigation system for an underwater vehicle, a typical UUV will also include a guidance & control system to autonomously pilot the vehicle to its intended destination. Accordingly, various sources of error with the navigation system 100 may be reduced through the use of additional information provided by the guidance & control system or by additional equipment which augment the basic functionality of the navigation system 100 described above. For example, the guidance & control system may include an inertial measurement unit (IMU) to determine the attitude and motion of the vehicle. A typical IMU includes three orthogonal accelerometers and at least three orthogonal angular rate sensors, although gyroscopic-based IMUs typically include at least one redundant response axis. The attitude and angular motion of the vehicle may be provided to the navigation system 100 so that the processor 110 can correct the microelectromechanical gyroscope data prior to the determination of latitude. If the vehicle mission requires accurate navigation on-site, then a traditional IMU may already be incorporated into the guidance & control system or payload, such as, for example, the Honeywell HG9900 IMU, which includes two digital laser gyros, three accelerometers and attendant electronics. The traditional IMU could be turned on and used sparingly (so as to conserve power) to provide latitude and longitude corrections to the navigation system 100.

If an IMU is not included within the guidance & control system, then additional components may be incorporated into the navigation system to improve the accuracy of the latitude and longitude measurements. In one embodiment, a MEMS IMU 140 may be coupled to the processor 110 to provide acceleration and angular rate data. The MEMS IMU 140 includes three orthogonal MEMS accelerometers, such as, for example, three Analog Devices ADXL105 single axis iMEMS accelerometers, and three orthogonal MEMS angular rate sensors, such as, for example, three Analogue Devices ADXRS150 single chip angular rate sensors. The MEMS IMU 140 uses much less power than a traditional IMU, and can be further deactivated, periodically, to conserve power. The IMU can also provide a dead-reckoning capability, allowing the navigation system 100 to estimate longitude during periods of extensive cloud cover, storms, etc. In a related embodiment, the MEMS IMU 140 may already include the microelectromechanical gyroscope 130 as an integral component.

In a further embodiment, a small altitude sonar 150 may be incorporated into the navigation system 100 to allow terrain-matching techniques to be used to increase navigational accuracy in areas where the bottom topography was mapped. In areas with significant terrain features, the improvement in accuracy with the addition of terrain-matching may be as large as a factor of two, producing approximately 5 nm accuracy in latitude and longitude. An exemplary sonar altimeter is the Model 1007 Hydroacoustic Altimeter Head, manufactured by Konsberg Maritime, which is coupled to an appropriate sonar signal processor, such as the processor 110, a Konsberg MS 1000 scanning sonar processor, etc. Bathymetric data 162 are loaded into memory 112, preferably in a read-only partition, or stored in a separate ROM. Many different terrain-following navigation techniques are known; one exemplary method is disclosed within "Terrain-Relative Navigation for Autonomous Underwater Vehicles," D. E. Di Massa and W. K. Stewart Jr., Oceans '97, MTS/IEEE Conference Proceedings, Vol. 1, pp. 541-546, October 1997, which is incorporated herein by reference in its entirety.

In an embodiment, a least-squares curve fitting technique may be applied to the series of measured positions to improve accuracy by about a factor of two, producing roughly 2 nm accuracy in both latitude and longitude when both terrain-matching and least squares data reduction techniques are used.

If dictated by mission requirements, periodic surfacings for precise GPS fixes could be used to improve system accuracy by replacing the estimated latitude and longitude with very accurate GPS-based position information. Accordingly, a GPS system 160, including a receiver and antenna, may be coupled to the processor 110. An exemplary receiver is the GPS 25, manufactured by Garmin Ltd. Subsequent estimates of latitude and longitude by the light sensor 120 and the microelectromechanical gyroscope 130 may be incorporated into the GPS-based position using a Kalman Filter, for example. Indeed, in one embodiment, the navigation system 100 includes several sources of position information having different accuracies and update periods, including the light sensor 120, the microelectromechanical gyroscope 130, the MEMS IMU 140, the altitude sonar 150 and bathymetric database 162, and the GPS 160. Preferably, a Kalman Filter would blend these data into the most accurate position estimate for the navigation system 100. Of course, a Kalman Filter would work quite well with any sensor suite.

A Doppler sonar (not shown) is another navigational aid that may be employed within navigational system 100. The Doppler sonar provides velocity information, which may also be integrated over time to provide latitude and longitude estimates for the Kalman Filter.

Figure 5:
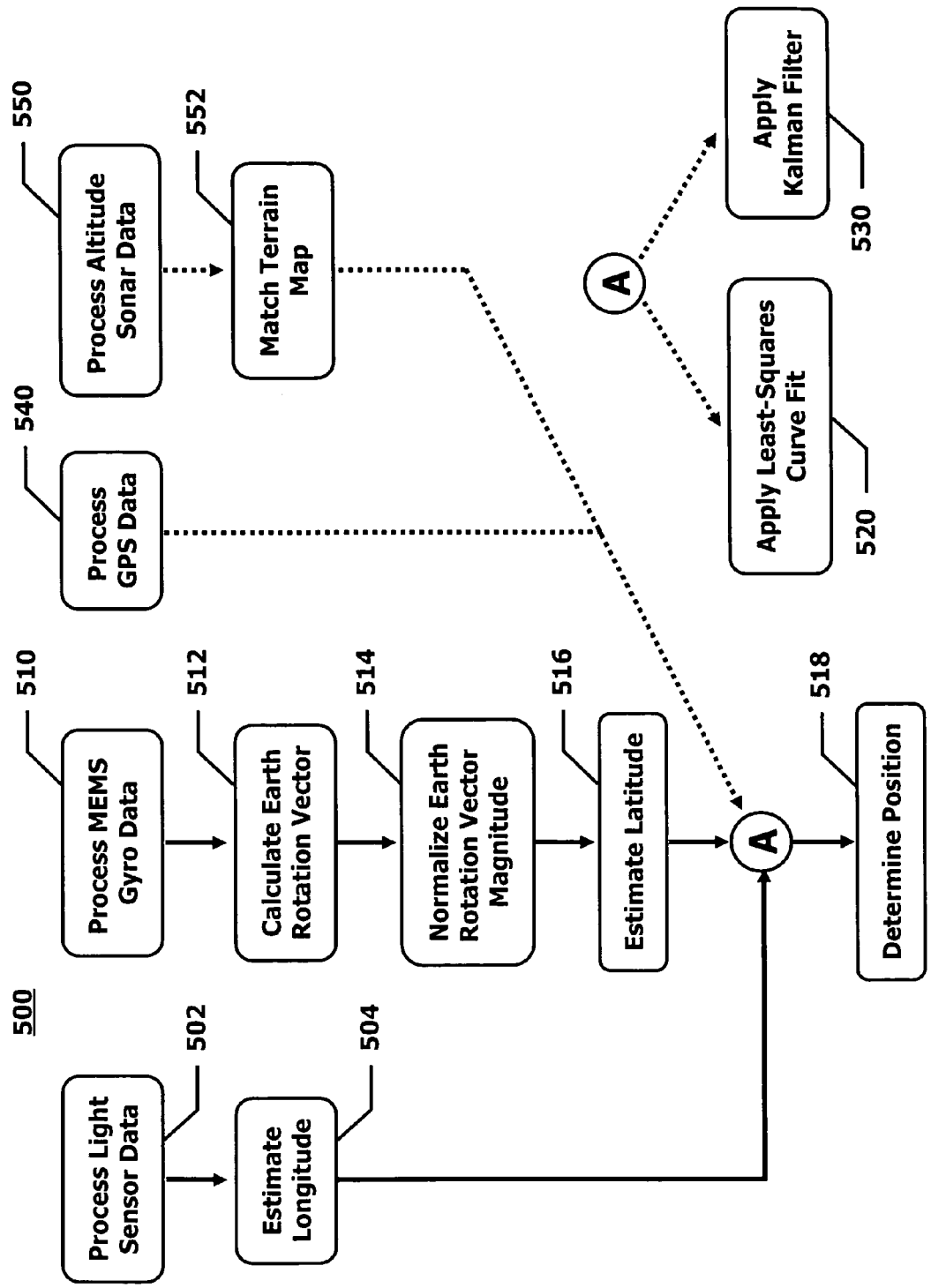
FIG. 5 is a flowchart depicting a navigation method for an underwater vehicle, in accordance with embodiments of the present invention.

FIG. 5 is a flowchart depicting a navigation method for an underwater vehicle, in accordance with embodiments of the present invention.

The light sensor 120 periodically transmits data to the processor 110, either autonomously or in response to a request from the processor 110. These data may include latitude, longitude, depth and temperature, as well as other information, such as, for example, raw ambient light level, measurement time, status telemetry, etc. The processor 110 processes (502) these data, extracts the longitude information and estimates (504) the longitude based on the extracted longitude information. In one embodiment, the data include a single longitude value, and the processor 110 simply uses the single longitude value as the estimated longitude. In another embodiment, the data include several longitude values, and the processor 110 may estimate (504) the longitude by averaging all of the longitude values together, by calculating the median value, etc.

Similarly, the microelectromechanical gyroscope 130 periodically transmits data to the processor 110, either autonomously or in response to a request from the processor 110. These data include angular rate information for the two orthogonal response axes, as well as other information, such as, for example, measurement time, status telemetry, etc. The processor 110 processes (510) these data, extracts the angular rate information, calculates (512) the magnitude of the earth rotation vector, normalizes (514) the earth rotation vector magnitude and estimates (516) the latitude based on the normalized magnitude of the earth rotation vector. In a preferred embodiment, the earth rotation vector is calculated by vectorially combining the two orthogonal angular rate vectors from which the magnitude is calculated (512), the earth rotation vector magnitude is normalized (514) using the maximum earth rotation vector magnitude and the latitude is estimated (516) by applying an inverse cosine function to the normalized earth rotation vector magnitude.

In one embodiment, the data include only two angular rate values, one for each orthogonal axis, and the processor 110 simply uses the two orthogonal angular rate values, as described above. In another embodiment, the data include several angular rate values, and the processor 110 processes (510) the angular rate values first by averaging all of the angular rate values together for each orthogonal axis, by calculating the median value for each orthogonal axis, etc.

The position of the vehicle is determined (518) by combining the estimated latitude and the estimated longitude. As described above, in one embodiment, a number of latitude and longitude estimates may be curve fit, by applying (520) a least-squares curve fit, to improve system accuracy and provide navigational information between measured points. Alternatively, a Kalman Filter may be applied (530) to the estimated latitude and longitude data, particularly if more than one data source is available for either component. Accordingly, in one embodiment, GPS data is processed (540) to extract latitude, longitude and time data, and blended with the data provided by the light sensor 120 and the microelectromechanical gyroscope 130 by applying (530) the Kalman Filter. Similarly, in a further embodiment, altitude sonar data is processed (550) to extract altitude, combined with time data and matched (552) to a terrain map 162 to determine latitude and longitude and then blended with the other sources of latitude and longitude information by applying (530) the Kalman Filter.

While this invention has been described in conjunction with specific embodiments thereof, many alternatives, modifications and variations will be apparent to those skilled in the art. Accordingly, the preferred embodiments of the invention as set forth herein, are intended to be illustrative, not limiting. Various changes may be made without departing from the true spirit and full scope of the invention as set forth herein.

What is claimed is:

1. A navigation system for an unmanned underwater vehicle, comprising:
   at least two navigation sensors, including at least one sensor that provides latitude and longitude measurements of unequal accuracy;
   a processor; and
   a memory storing a machine-readable set of instructions executable by the processor to:
   process the latitude and longitude measurements received from the navigation sensors, and
   determine vehicle latitude and longitude with approximately equal accuracy by combining an estimated latitude based on a measurement from a first of the sensors with an estimated longitude based on a measurement from a second of the sensors.

2. The navigation system according to claim 1, wherein the navigation sensors include:
   a first navigation sensor to provide latitude data and longitude data, the longitude data being more accurate than the latitude data; and
   a second navigation sensor to provide at least latitude data, the latitude data being as accurate as the first navigation sensor longitude data.

3. The navigation system according to claim 2, wherein the first navigation sensor longitude data is an order of magnitude more accurate than the first navigation sensor latitude data.

4. The navigation system according to claim 2, wherein the second navigation sensor provides longitude data that is less accurate than the second navigation sensor latitude data.

5. The navigation system according to claim 1, wherein the machine-readable set of instructions are further executable by the processor to estimate vehicle latitude and longitude using a least-squares curve fit.

6. The navigation system according to claim 1, wherein the machine-readable set of instructions are further executable by the processor to estimate vehicle latitude and longitude using a Kalman Filter.

7. The navigation system of claim 1, wherein the navigation sensors include an altitude sensor, and wherein the machine-readable set of instructions are further executable by the processor to estimate vehicle latitude and longitude by matching the altitude data to a bathymetric map database.

8. The navigation system of claim 1, wherein the navigation sensors include a GPS receiver to provide latitude and longitude data of similar accuracy, and wherein the machine-readable set of instructions are further executable by the processor to estimate vehicle latitude and longitude based on the GPS data.

9. The navigation system of claim 1, wherein the navigation sensors include a MEMS inertial measurement unit to provide three dimensional position data of similar relative accuracy, and wherein the machine-readable set of instructions are further executable by the processor to estimate vehicle latitude and longitude based on the MEMS inertial measurement unit data.

10. An underwater navigation system, comprising:
    a light sensor to provide at least longitude data;
    a microelectromechanical gyroscope to provide angular rate data about two orthogonal axes; and
    a processor, coupled to a memory, the light sensor and the microelectromechanical gyroscope, adapted to estimate position based on a combination of the light sensor data and the microelectromechanical gyroscope angular rate data;
    wherein a position estimate includes a longitude estimate provided by the light sensor and a latitude estimate determined from the microelectromechanical gyroscope angular rate data.

11. The underwater navigation system of claim 10, further comprising three orthogonal microelectromechanical accelerometers, coupled to the processor, to provide acceleration data.

12. The underwater navigation system of claim 10, wherein the processor is adapted to estimate position using a least-squares curve fit technique.

13. The underwater navigation system of claim 10, wherein the processor is adapted to estimate position using a Kalman Filter.

14. The underwater navigation system of claim 10, further comprising:
    a bathymetric map database; and
    an altitude sonar to provide altitude data,
    wherein the processor is further adapted to match the altitude data to the bathymetric data to estimate position.

15. The underwater navigation system of claim 10, further comprising a GPS receiver to provide latitude and longitude data, wherein the processor is further adapted to estimate position based on the light sensor data, the microelectromechanical gyroscope data and the GPS data.

16. The underwater navigation system of claim 10, further comprising a microelectromechanical inertial measurement unit, including three orthogonal angular rate sensors to provide angular rate data, and three orthogonal accelerometers to provide acceleration data, wherein the processor is further adapted to estimate position based on the light sensor data, the microelectromechanical gyroscope data and the microelectromechanical inertial measurement unit data.

17. A navigation method for an underwater vehicle, comprising:
processing light sensor data to estimate longitude;
processing microelectromechanical gyroscope angular rate data to estimate latitude, including:
calculating an earth rotation vector based on the microelectromechanical gyroscope angular rate data,
normalizing the magnitude of the earth rotation vector, and
estimating latitude based on the normalized earth rotation vector magnitude; and
determining the position of the vehicle based on the estimated latitude and the estimated longitude.

18. The underwater navigation method of claim 17, wherein the microelectromechanical gyroscope angular rate data includes two orthogonal angular rate vectors and the earth rotation vector is calculated by vectorially combining the two orthogonal angular rate vectors.

19. The underwater navigation method of claim 17, wherein the earth rotation vector magnitude is normalized by a maximum earth rotation vector magnitude determined apriori.

20. The underwater navigation method of claim 17, wherein the latitude is estimated by applying an inverse cosine function to the normalized earth rotation vector magnitude.

21. The underwater navigation method of claim 17, further comprising applying a least squares curve fit to the estimated latitude and longitude.

22. The underwater navigation method of claim 17, further comprising applying a Kalman Filter to the estimated latitude and longitude.

23. The underwater navigation method of claim 17, wherein said processing microelectromechanical gyroscope angular rate data further comprises correcting the microelectromechanical gyroscope angular rate data based on vehicle attitude.

24. The underwater navigation method of claim 17, further comprising:
processing GPS data to provide latitude and longitude; and
applying a Kalman Filter to the estimated light sensor longitude, the estimated microelectromechanical gyroscope latitude and the GPS latitude and longitude.

25. The underwater navigation method of claim 17, further comprising:
processing altitude sonar data to provide a vehicle altitude;
matching a terrain map to the altitude data to estimate latitude and longitude; and
applying a Kalman Filter to the estimated light sensor longitude, the estimated microelectromechanical gyroscope latitude and the map-matched latitude and longitude.

* * * * *